United States Patent
Tal et al.

(10) Patent No.: US 10,348,798 B2
(45) Date of Patent: Jul. 9, 2019

(54) RULES ENGINE FOR CONNECTED DEVICES

(71) Applicant: Facebook, Inc., Menlo Park, CA (US)

(72) Inventors: Eran Tal, San Jose, CA (US); Martin Rehwald, Mountain View, CA (US); Francislav Penov, Kirkland, WA (US); Siyin Yang, Mercer Island, WA (US); Damian Kowalewski, Sunnyvale, CA (US); Georgiy Yakovlev, Pacifica, CA (US); Anupma Chhabra, Fremont, CA (US); Zachary Chee-Ping Lawrence, College Park, MD (US); Rizwan Ahmad, Menlo Park, CA (US); Dung Nguyen Tien, Newport News, VA (US); Angelica Estefania Escareno, San Francisco, CA (US); Aidymar Bigio, Hillsborough, CA (US)

(73) Assignee: Facebook, Inc., Menlo Park, CA (US)

( * ) Notice: Subject to any disclaimer, the term of this patent is extended or adjusted under 35 U.S.C. 154(b) by 25 days.

(21) Appl. No.: 15/228,002

(22) Filed: Aug. 4, 2016

(65) Prior Publication Data

US 2017/0041373 A1 Feb. 9, 2017

Related U.S. Application Data

(60) Provisional application No. 62/201,496, filed on Aug. 5, 2015.

(51) Int. Cl.
*G06F 15/16* (2006.01)
*H04L 29/08* (2006.01)
(Continued)

(52) U.S. Cl.
CPC ............. *H04L 67/02* (2013.01); *G06Q 10/10* (2013.01); *G06Q 50/01* (2013.01); *H04L 51/24* (2013.01);
(Continued)

(58) Field of Classification Search
CPC ...... G06K 9/00342; G06K 2009/00738; G06T 7/20; G11B 27/031
See application file for complete search history.

(56) References Cited

U.S. PATENT DOCUMENTS 8,499,245 B1 * 7/2013 Froment ................. H04L 67/22
715/734
9,047,271 B1 * 6/2015 Mengibar ........... G06F 17/2765
(Continued)

FOREIGN PATENT DOCUMENTS

GB 2 454 583 A 5/2009
WO WO 2014/172567 A1 10/2014
(Continued)

OTHER PUBLICATIONS

Communication, European Search Report, Annex to the European Search Report, European Patent Office, Patent Application No. EP 16 18 3055, dated Nov. 21, 2016.
(Continued)

*Primary Examiner* — Mohamed Ibrahim
(74) *Attorney, Agent, or Firm* — Baker Botts L.L.P.

(57) ABSTRACT

In one embodiment, a method includes receiving notifications of events associated with the connected devices, evaluating a plurality of event sequences that include two or more events occurring within a particular time period, and generating a plurality of rules based on the evaluated event sequences. The method further includes receiving a notification of a first event associated with a first connected device on the network, determining that a first rule of the plurality
(Continued)

of rules is based on the first event, and sending one or more instructions to connected devices in accordance with the first rule.

19 Claims, 5 Drawing Sheets

(51) Int. Cl.
  *H04W 4/80* (2018.01)
  *G06Q 10/10* (2012.01)
  *G06Q 50/00* (2012.01)
  *H04L 12/58* (2006.01)
(52) U.S. Cl.
  CPC .............. *H04L 51/32* (2013.01); *H04L 67/20* (2013.01); *H04L 67/26* (2013.01); *H04W 4/80* (2018.02)

(56) References Cited

U.S. PATENT DOCUMENTS

| | | | |
|---|---|---|---|
| 9,727,115 | B1* | 8/2017 | Brown ................... G06F 1/3206 |
| 2001/0041980 | A1 | 11/2001 | Howard |
| 2005/0037708 | A1 | 2/2005 | Torvinen |
| 2005/0096913 | A1 | 5/2005 | Coffman |
| 2006/0053229 | A1 | 3/2006 | Choi |
| 2009/0204578 | A1 | 8/2009 | Dang |
| 2010/0263032 | A1 | 10/2010 | Bhuyan |
| 2011/0098029 | A1* | 4/2011 | Rhoads ............... G01C 21/3629 455/418 |
| 2011/0106779 | A1 | 5/2011 | George |
| 2011/0252240 | A1 | 10/2011 | Freedman |
| 2012/0166380 | A1* | 6/2012 | Sridharan ............... G06Q 30/02 706/52 |
| 2013/0006903 | A1* | 1/2013 | Vishwakarma ........... H02J 3/00 706/18 |
| 2013/0065584 | A1 | 3/2013 | Lyon |
| 2013/0080520 | A1 | 3/2013 | Kiukkonen |
| 2013/0124194 | A1 | 5/2013 | Nadal |
| 2013/0254315 | A1 | 9/2013 | Solyanik |
| 2013/0283358 | A1 | 10/2013 | Manroa |
| 2013/0285800 | A1 | 10/2013 | Liu |
| 2013/0305330 | A1 | 11/2013 | Palanigounder |
| 2014/0041055 | A1 | 2/2014 | Shaffer |
| 2014/0090034 | A1 | 3/2014 | Fyke |
| 2014/0108935 | A1* | 4/2014 | Yuen ....................... G06F 3/048 715/728 |
| 2014/0109835 | A1 | 4/2014 | Colvin |
| 2014/0164611 | A1* | 6/2014 | Molettiere ............ A61B 5/1112 709/224 |
| 2014/0188935 | A1* | 7/2014 | Vee ..................... G06F 17/3043 707/771 |
| 2014/0201133 | A1* | 7/2014 | Kawabata ......... G06F 17/30958 707/609 |
| 2014/0330809 | A1* | 11/2014 | Raina .................. G06F 17/2705 707/722 |
| 2014/0359018 | A1* | 12/2014 | Sun ....................... H04L 65/403 709/204 |
| 2014/0369275 | A1 | 12/2014 | Fleck |
| 2015/0019553 | A1* | 1/2015 | Shaashua .......... G06F 17/30705 707/737 |
| 2015/0058226 | A1 | 2/2015 | Gupta |
| 2015/0067541 | A1 | 3/2015 | Owens |
| 2015/0163121 | A1* | 6/2015 | Mahaffey ............ G06F 11/0766 707/687 |
| 2015/0172997 | A1 | 6/2015 | Griot |
| 2015/0309492 | A1* | 10/2015 | Patel ................... H04L 12/2803 700/275 |
| 2015/0317801 | A1* | 10/2015 | Patel ................... H04L 12/2803 700/275 |
| 2016/0072840 | A1* | 3/2016 | Iyer ..................... H04L 63/1408 726/1 |
| 2016/0302060 | A1* | 10/2016 | Agardh ................... H04L 67/16 |

FOREIGN PATENT DOCUMENTS

| | | |
|---|---|---|
| WO | WO 2015/006045 A1 | 1/2015 |
| WO | WO 2015/050892 A1 | 4/2015 |
| WO | WO 2015/092484 A1 | 6/2015 |

OTHER PUBLICATIONS

Communication, European Search Report, Annex to the European Search Report, European Patent Office, Patent Application No. EP 16 18 3058, dated Nov. 21, 2016.
Communication, European Search Report, Annex to the European Search Report, European Patent Office, Patent Application No. EP 16 18 3068, dated Nov. 21, 2016.
Communication, European Search Report, Annex to the European Search Report, European Patent Office, Patent Application No. EP 16 18 3066, dated Nov. 21, 2016.
Communication, European Search Report, Annex to the European Search Report, European Patent Office, Patent Application No. EP 16 18 3067, dated Nov. 21, 2016.
Jang-Ho Choi, Dong-Oh Kang, Joon Young Jung, and Changseok Bae, "Estimating Social Tie Strength for Autonomous D2D Collaborations," International Journal of Future Computer and Communication, vol. 4, No. 1, Feb. 2015.
International Search Report and Written Opinion for International Application PCT/US2016/045684, dated Nov. 8, 2016.
International Search Report and Written Opinion for International Application PCT/US2016/045680, dated Nov. 9, 2016.
International Search Report and Written Opinion for International Application PCT/US2016/045689, dated Nov. 10, 2016.
International Search Report and Written Opinion for International Application PCT/US2016/045683, dated Nov. 10, 2016.
International Search Report and Written Opinion for International Application PCT/US2016/045679, dated Nov. 15, 2016.

* cited by examiner

RULES ENGINE FOR CONNECTED DEVICES

PRIORITY

This application claims the benefit, under 35 U.S.C. § 119(e), of U.S. Provisional Patent Application No. 62/201,496, filed 5 Aug. 2015, which is incorporated herein by reference.

TECHNICAL FIELD

This disclosure generally relates to a network of objects embedded with electronics and software to enable objects to exchange data with a system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a system receives event notifications for connected devices on a network. The events may be occurrences associated with the connected devices. The system evaluates event sequences that include two or more events occurring within a particular time period, and generates rules based on the evaluated sequences. The particular time period for the event sequences may be pre-determined or may be determined using historical data. In certain embodiments, the event sequences may be scored and rules may be generated for the event sequences based on the scores. In some embodiments, rules may only be generated for those event sequences having a score greater than a threshold. Once rules are generated, new event notifications are compared with the rules to determine whether a particular rule has been triggered based on the new event. If so, instructions are sent to connected devices in accordance with the triggered rule.

The embodiments disclosed below are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
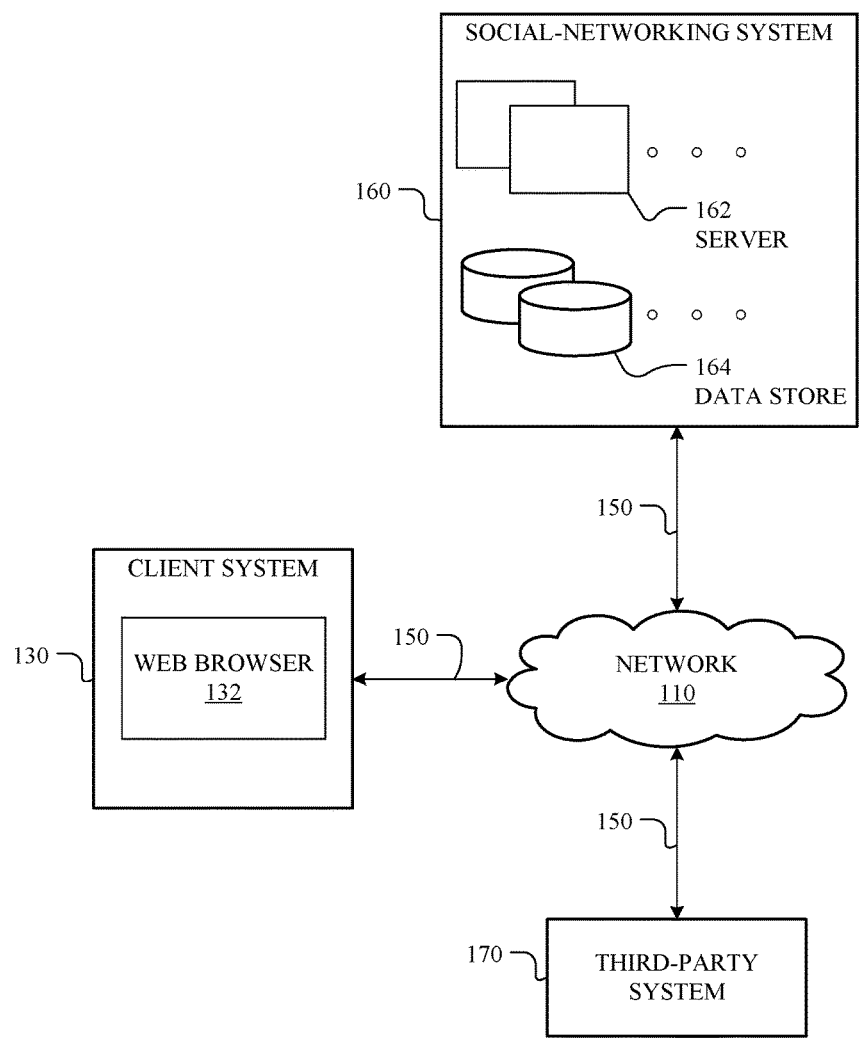
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example, network environment 100 may include multiple client system 130, social-networking systems 160, third-party systems 170, and networks 110.

This disclosure contemplates any suitable network 110. As an example, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example, content objects may include information regarding things or activities of interest to the user, such as, for example, movie show times, movie reviews, restaurant reviews, restaurant menus, product information and reviews, or other suitable information. As another example, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
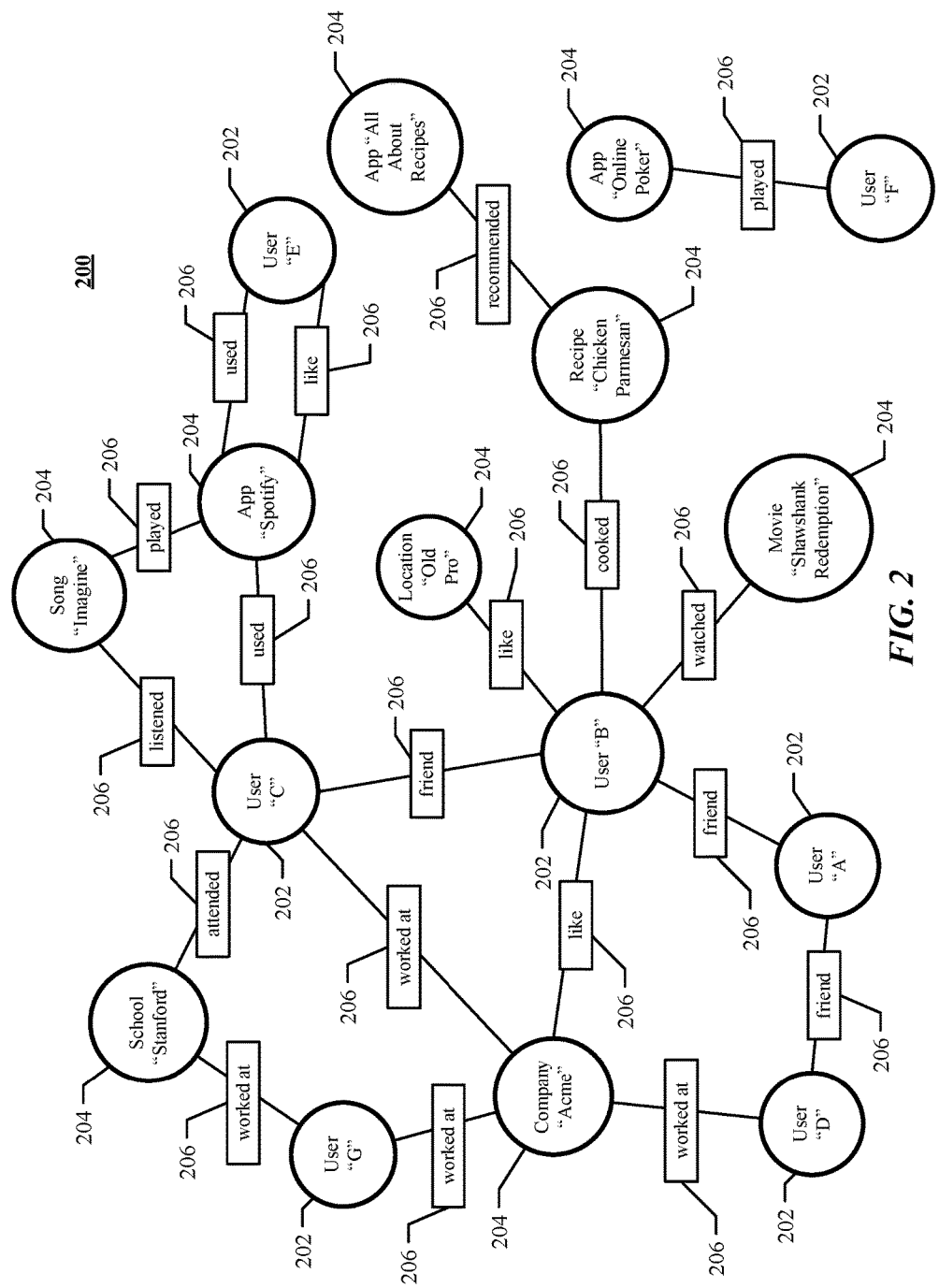
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example, a profile page corresponding to a particular external webpage may be the particular external webpage and the profile page may correspond to a particular concept node 204. Profile pages may be viewable by all or a selected subset of other users. As an example, a user node 202 may have a corresponding user-profile page in which the corresponding user may add content, make declarations, or otherwise express him or her self. As another example, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, an organization, or a brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream"

and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example, social-graph entities that are closer in the social graph 200 (e.g., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example, the coefficient may be used to generate media for the user, where the user may be presented with media for which the user has a high overall coefficient with respect to the media object. As another example, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity)

for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object may have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3:
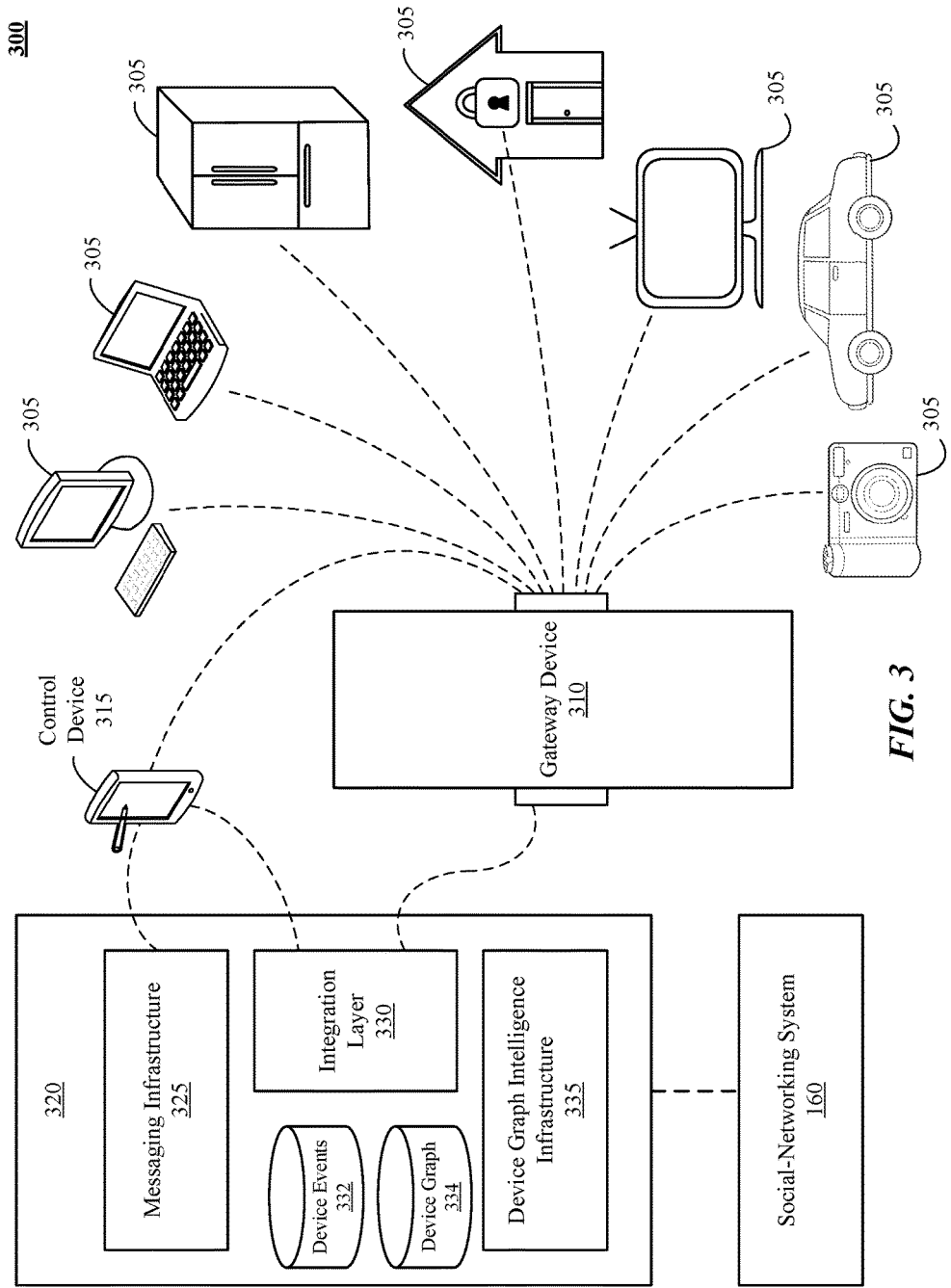
FIG. 3 illustrates an example architecture for managing a device cloud.

FIG. 3 illustrates an example system 300 comprising a set of connected devices 305, gateway device 310, control device 315, and backend system 320 connected to social network 160. Connected devices 305, gateway device 310, control device 315, and backend system 320 may each comprise one or more computer systems, such as computer system 500 of FIG. 5. Connected devices 305, gateway device 310, control device 315, and backend system 320 may communicate with one another via any suitable network comprising any suitable connections (e.g., network 110 of FIG. 1, with wireline connections, wireless connections, or a combination thereof). The architecture of system 300 may be used for the devices present within a defined physical space (e.g., a house, an office building, or a park), or with a set of devices related to a particular user or entity (e.g., connected devices associated with a user, where the devices are located in their home, their car, and/or their small retail business; or belonging to a property management business managing door locks and alarm security systems for a group of buildings). In embodiments involving a single physical location, only a single gateway device 310 may be needed to connect the connected devices 305 to control device 315 and/or backend system 320. However, it will be understood that multiple gateway devices 310 may be used in certain embodiments (e.g., in large spaces where enhanced wireless coverage is needed). In embodiments involving multiple physical locations, each of the physical locations (e.g., house, car, and business) may each have its own respective gateway device 310 that connects the connected devices 305 of that location to control device 315 and/or backend system 320. As in the single location example, it will be understood that multiple gateway devices 310 may be used in each physical location (e.g., in large spaces where enhanced wireless coverage is needed). In embodiments with multiple gateway devices 310, each gateway device 310 may communicate with one another.

Connected devices 305 may include any suitable device for transmitting information associated with the device 305 (e.g., event notifications) to gateway device 310 and/or backend system 320 (by way of gateway device 310). Connected devices 305 may include anything from complex embedded computing devices, to switches, to simple sensors. For example, the connected devices depicted in FIG. 3 include a desktop computer, a laptop, a refrigerator, a home security system, a television, a vehicle, and a SLR camera. In particular embodiments, one or more of connected devices 305 may be operable to detect one or more environmental conditions, such as a time of day, day of the week, whether it is dark or light outside, an outside temperature, an ambient temperature, or any other suitable environmental condition. The environmental condition may be detected by the connected device 305 using a sensor located on or coupled to the device (e.g., a thermometer coupled to a thermostat), by accessing information stored at the connected device 305 (e.g., time, day, or date information stored locally on the device), by gathering information from another connected device 305, gateway 310, or backend system 320 (e.g., sensor information or time, day, or date information), by gathering information from other sources (e.g., the Internet), or by gathering information from any combination of the above (e.g., using the Internet to determine whether it was light or dark outside and/or what the weather was like at 5:47 pm on a particular day).

Gateway device 310 may include any suitable device for interfacing with connected devices 305, control device 315, and/or backend system 320. In particular embodiments, gateway device 310 may be capable of supporting the required functionality to facilitate local network control of connected devices 305 and act as a local gateway for a service that may run in the cloud (e.g., on backend system 320). In particular embodiments, the service may facilitate communication with the user (e.g., via control device 315). In particular embodiments, the service and the user may communicate using natural language which may then be parsed by one or more components of system 300 (e.g., by control device 315, gateway device 310, backend system 320, or a combination thereof). In particular embodiments, a user may use a messaging application on control device 315 to communicate with gateway device 310 and/or with any of the connected devices 305 (by way of the gateway device 310). In particular embodiments, gateway device 310 may be based on a RASPBERRY PI platform running RASPIAN Linux and supporting WiFi, BLUETOOTH, ZWAVE and ZIGBEE dongles. Gateway device 310 may be used to host a gateway application that interfaces between the devices of system 300.

Control device 315 may include any suitable device for presenting a user interface for interfacing with gateway device 310 and connected devices 305 (by way of gateway device 310). For example, control device 315 present a user interface by way of an installed application, a browser, a SMS texting interface, or an interface provided by the device's operating system that allows a user of control device 315 to control, or send/receive information to, gateway device 310 and/or connected devices 305. In particular embodiments, control device 315 may include one or more UI clients (e.g., a messaging service application), which acts as the main UX point; Social networking application or other mobile application—a helper application, used for initial provisioning, BLUETOOTH and location discovery, and generally anything permission related that the messaging application service application cannot do. In particular embodiments, a control application running on control device 315 may be used by the user to provision connected devices 305. In further embodiments, the control application may provide a specific user experience for the user based on particular scenarios. In particular embodiments, the control application running on control device 315 may enable the viewing of information related to connected devices 305, the setup and management of rules automatically generated by system 300 (such as rules generated using method 400 below), and pushing status updates from the connected devices 305 to a messaging application on the control device 315.

Backend system 320 may include any suitable server or group of servers for interfacing with, and aggregating data from, connected devices 305, gateway device 310, and control device 315 in system 300, as well as connected devices, gateway devices, and control devices in other systems that communicate with backend system 320. Backend system 320 may comprise a messaging infrastructure 325 (e.g., to communicate with control device 315), an integration layer 330 (e.g., a platform and/or API to interface with a diverse array of connected devices, such as PARSE) to interface between elements of backend system 320 and gateway device 310 (and/or control device 315 and/or directly with connected devices 305). Backend system 320 may maintain a data store 332 of device events, comprising data received from gateway device 310 and each of the connected devices 305, as well as data derived therefrom. Backend system 320 may also maintain a data store 334 for one or more device graphs, in which gateway device 310 and each of the connected devices 305 may each be represented by a device node with edges connecting the device nodes. Backend system 320 may include a device graph intelligence infrastructure 335 for processing and analyzing the device events, updating the device graph, and providing feedback and/or instructions to connected devices 305 and/or control device 315. In particular embodiments, certain functionality (e.g., evaluating event sequences and generating rules therefor in accordance with the present disclosure) may be provided by gateway device 310, by backend system 320, or by a combination thereof.

Backend system 320 may also communicate with social-networking system 160. In particular embodiments, backend system 320 may leverage social-networking system 160, a social graph associated with social-networking system 160, particular identities in such a social graph, notifications provided to users of social-networking system 160, or any combination thereof. For example, backend system 320 may utilize identifying information for a user of one or more connected devices 305 based on information from the social-networking system 160 to determine the user that performed an action with a particular connected device 305 (e.g., identifying the user performing user input related to a connected device 305) or that was associated with an event occurring at connected device 305 (e.g., identifying the user that opened or unlocked a door).

In particular embodiments, gateway device 310 may have an application running thereon, wherein its responsibilities consist of understanding and dealing at "physical" level with the various connected devices 305 in system 300. This may include, for example: discovery and provisioning of new connected devices 305 over BLUETOOTH, ZIBGEE, ZWAVE, WiFi (via a wireless access point or direct connection); mapping of connected devices 305 to a device type and/or device ID; mapping of the device type to available capabilities and/or functionalities; grouping or association of connected devices 305 in vertical (such as those with the same or similar capabilities, e.g., "lights" or "door locks"); support for understanding various industry protocols (e.g., for example ALLJOYN, THREAD, WEAVE, ZIGBEE, and the like); translating specific intents (e.g., associated with specific device IDs) passed from backend system 320 into direct control and query messages (e.g., "device ID(s) XXX on" passed on from gateway device→"Phillips Hue device ID XXX turn on"); translating specific device notifications into logical notifications that can be interpreted by backend system 320 (e.g., "August SmartLock device id XXX unlocked"→"device ID XXX unlocked") or communicated to control device 315. In particular embodiments, while gateway device 301 may perform some mapping between physical and logical devices, it may convert these into machine-readable structured formats.

In particular embodiments, the gateway application running on gateway device 310 may support a number of various vendors' or manufacturers' connected devices 305. For example, the gateway application may support discovery and provisioning of two or more connected lights from multiple vendors (e.g., PHILLIPS HUE, BELKIN WEMO WiFi switch, ZIGBEE or ZWAVE smart switch); control of one or more pre-provisioned smart locks from different vendors (e.g., LOCKITRON, AUGUST); control and streaming of music and/or video to multiple targets over WiFi-connected speakers and/or smart TVs and the gateway device itself (e.g., via an HDMI port).

In particular embodiments, backend system 320 may include an application or service running thereon (or in the cloud) that communicates with gateway device 310. It may handle integration with messaging applications and natural language processing systems (NLP), translation of the user's intent to specific logical device control intents (e.g., using NLP and context awareness), and machine learning (ML) to infer complex behavior rules involving multiple devices. In particular embodiments, backend system 320 may only interface with individual ones of connected devices 305 by way of gateway device 310. In particular embodiments, backend system 320 may deal with logical devices (e.g., "lights" vs "PHILLIPS HUE"), aliases assigned by a user (e.g., "front porch light") and device groups (e.g., "all lights"). As such, backend system 320 may provide one or more of the following interfaces and capabilities:

1. Association of human naming of devices with logical ID provided by Home Gateway (e.g., user chooses name "Front Door Light" for a device id); Grouping/association of devices along a horizontal (same location, e.g., "living room" or "front door);
2. Mapping of device capabilities to human input/output commands;
3. Translating specific intents passed from the user associated with the specific names they have assigned devices into a device ID based actions. (e.g., "Turn on Front Porch Light"→"device id(s) XXX on");
4. Translating specific device notifications passed forward by the home gateway into human readable format (e.g., "device ID XXX unlocked"→"Front Door Unlocked").

In particular embodiments, additional features provided by system 300 may include: NLP control and notifications of one or more connected devices 305 through a messaging application, explicit grouping of devices by the user, and creating and executing multi-device instructions (e.g., "when front door is unlocked, turn the lights on").

In particular embodiments, to be able to interpret commands in a context aware fashion, the logic relies on a view of the device graph based on a userID (the user who wants to take action) and/or location information (e.g., based on signals like cell IDs of mobile networks around, WiFi geolocation, visible SSIDs etc. in addition to strong localization via GPS coordinates). For example, a user might be associated with multiple gateway devices 310 (e.g., a primary family home, a weekend condo, and a secondary home), in which case location information may determine to which devices a particular command should apply. In particular embodiments, the system 300 (by way of backend system 320 and/or gateway device(s) 310) may provide for configuration of user role settings (user, command and location-based) in the device graph (e.g., permission models may allow for configuration of an admin role for full control and a limited user role with limited permissions). For example, a user may not want their kids (who are playing in the living room where the stereo system is located) to change the music the user is currently enjoying while working in his home office.

In particular embodiments, system 300 (e.g., using backend system 320 and/or gateway device 310) may learn the habits and behaviors of a user and may generate automatic rules in accordance with those habits and behaviors. For example, upon a user coming home after work, the user may typically turn on their stereo shortly thereafter. One or more components of system 300 may detect this habit, and generate a rule that turns on the stereo when the user unlocks or opens the door after a particular time in the evening.

In particular embodiments, system 300 may learn the user's behaviors, trends, and habits by analyzing event sequences that occur within a particular time period (e.g., within a maximum amount of time) and may determine a score for event sequences. Upon the score reaching a certain threshold, a rule may be generated for the event sequence and may be employed by the system. In particular embodiments, system 300 may take into account environmental conditions (e.g., what time it is, what day of the week (e.g., weekend vs. weekday), whether it is light or dark outside, what the temperature inside or outside the building (or both) is, etc.) when evaluating the event sequences and/or generating rules therefor. In further embodiments, rules may be specific to each event sequence and there will be exceptions to each sequence. For instance, using the above example of the user coming home and the stereo turning on automatically, the rule may have a time-based exception to not turn on the stereo until after 5 pm, or may not turn on the stereo upon the user coming home on the weekend.

In particular embodiments, an event is generated by a connected device 305 (e.g., a door is unlocked or opened/closed, a light in the bathroom is turned on, etc.). After the event occurs, events thereafter that occur within a particular time period (e.g., 1 minute, 5 minutes, or 10 minutes) may be evaluated. The evaluation may look at a delta, or time slice, between each of the events in the event sequence and/or conditional factors (e.g., environmental conditions or a status of the connected devices 305 at the time), and may determine whether the event sequence is habitual and/or intentional, or otherwise. For instance, system 300 may determine whether the event sequence has occurred previously and may determine or adjust a score associated with the event sequence accordingly.

For example, in particular embodiments, when an event occurs, the events within a particular time delta (referred to as Dmax in this paragraph, which may be 1 minute in some embodiments, or determined experimentally in other embodiments) are evaluated (e.g., Event1, Event2, ... ). A score is then generated for the sequence based on the equation:

$$\text{Score}=1-\Pi(D\text{max}-\min(\text{delta}N, D\text{max}))/D\text{max}.$$

The score may be evaluated against previous event sequences and/or conditions surrounding the event sequence. If an event sequence with the same condition has previously occurred, then the score may be multiplied or otherwise modified. After the scoring or score adjustment, a later calculation may be employed to determine whether or not the score exceeds a certain threshold. If the score does exceed the threshold, a rule may be generated to automatically implement the event sequence upon seeing a particular event and/or condition occur in the future. Using the above example, when system 300 detects the user unlocking the door in the evening (e.g., after 5 pm), system 300 may send instructions to the stereo to turn on (e.g., using a push command as described below). An example method for generating rules based on detected event sequences is described below with respect to FIG. 4.

In particular embodiments, a rules runtime interpreter may run on backend system 320, and comprise a JAVASCRIPT application that reads locally-stored rules, spawns the main process (e.g., pushes instructions to connected devices 305) and monitors any output. Backend system may then (a) parse the pushed data received from integration layer 330 and (b) based on the parsed information, do one or more of: updating the rules; storing new rules locally; executing device control; executing queries; discovering devices; parsing the rules; waiting for triggers indicated by the rules (e.g., a time or a sensor measurement); executing events on the triggers; executing device control; running a local webserver which allows triggering of the rules via local networks.

Example Push Protocol

```
Field "command", required, type "string", values
"query"|"discover"|"control"|"rule"|"user"
"command" == "rule" operate on the rule:
    Field "rule_id" - required for "command" == "rule", type:
string, id of the rule
    Field "action" - optional, type:string, values:
"update"|"delete", default "update"
        "update" - updates or creates (if necessary) the rule
        "delete" - deletes the rule
        Field "rule_data" - required if "action"=="update",
type:json, rule to be added/updated to rules.data
"command" == "discover" - discovers devices. No arguments.
Updates PARSE devices table.
"command"=="query" - queries the device state,
"command"=="control" -controls the device:
    Field: "device_id"- required, type:string , id of the
device
    Field: "settings" - required for "command" == "control",
device-specific control requests.
    query posts "device_state" message back to query posts
"device_state" message back to integration layer 330
"command" == "user" - backend sends an authorized user's
SYSTEMID to the gateway device. This is a tradeoff when device
login is not completed, otherwise the gateway device may not
know which user is controlling it. The gateway device may save
the user identification to a file and read it when saving a
"DeviceMessage".
```

Example Device Instructions

```
Lights
    PHILIPS HUE
        hue_get(device_id, light_id)
            Get the state (on/off status, hue, brightness,
            saturation, etc.) of all or a specific bulb.
        hue_set(device_id, light_id, power, bri, hue, sat)
            Set the state of a specific bulb
        hue_config(ip, user)
            Add a new user to a PHILIPS HUE bridge.
            May prompt a user to press the safety button on
            the PHILIPS HUE bridge
            Returns device id
Speakers
    Music player
        music player_play(device_id)
        music player_pause(device_id)
        music player_next(device_id)
```

```
music player_previous(device_id)
music player_play_uri(device_id)
music player_clear_queue(device_id)
music player_add_toqueue(device_id)
music player_play_mode(device_id)
music player_get_volume(device_id)
music player_config(ip)
```

In particular embodiments, a push from integration layer 330 may be in curl format as shown below:

```
curl -X POST \
-H "X-PARSE-Application-Id: *PARSE APP ID*" \
-H "X-PARSE-REST-API-Key: *PARSE REST KEY*" \
-H "Content-Type: application/json" \
-d "{
    "where": {
        "installationId": *GATEWAY INSTALLATION ID*
        "deviceType": "embedded"
    },
    "data": {
        "command": *COMMAND*
        ...
    }
}"
```

In particular embodiments, the App ID (e.g., device ID) and REST key should be taken from the particular device being used. The current app's id/key is: "ro2sqHypZCVs4qe6dwvj31gOYLaux6hBFGd6J54g", "dl5gBnYcsubgJtG91dGPYi0x40rFWu2 ZyNxJ6inZ". In particular embodiments, the where clause may be used when directing a push to a single connected device 305 or particular connected devices 305. In particular embodiments, the where clause may be omitted to send a push to all connected devices 305. In particular embodiments, the gateway installation ID is a unique identifier generated for each connected device 305. It may also be stored in integration layer 330 in certain embodiments. In particular embodiments, the command can be one of: rule, discover, query, control, or update. Each of these commands expects specific fields to follow the command key (which are outlined below).

In particular embodiments, the push data fields of a rule command may be in the format shown below:

```
"data": {
    "command": "rule",
    "action": "update / delete",
    "rule_id": "rule_id",
    "rule_data": {
        "name": "rule_name",
        "trigger": "*DESCRIBED BELOW*",
        "cron": "* * * * *",
        "conditions": "*DESCRIBED BELOW*",
        "actions": "*DESCRIBED BELOW**SAME AS CONTROL COMMAND*"
    }
}
```

In particular embodiments, the command is the same as above. In this case, it specifies that the current push deals with a rule. In particular embodiments, the action field specifies what will be happening with the rule—either "update" or "delete". If not specified, it will default to update. Update should be used to create or update rules, and delete will delete a rule. In particular embodiments, the rule_id field specifies what rule will be acted upon. It must always be specified even if a new rule is being created (in which case it will be used as the new rule's id). It may also be unique. In particular embodiments, the rule_data field is used only for update actions and is not used for delete actions. It contains the data that will be used to update/save the rule with. The specific fields are below. In further embodiments, The name field specifies the name for the rule. This should typically be a more friendly name for the rule with which the user can use to reference it.

In further embodiments, the trigger field is used to specify the trigger for the rule. Two types of triggers are supported—a device based trigger, which is fired when a device enters a certain state, and a time-based trigger, which is used to set off cron jobs. In particular embodiments, the trigger field may look like the following example below. The event field may be structured identically to the "state" field on a condition, except it does not support "time".

```
"trigger": {
    "deviceId": "dev_id",
    "event": {
        "check_type": "range",
        "range_min": 0,
        "range_max": 1
    }
    OR
    "event": {
        "check_type": "value",
        "value": 1
    }
}
```

In particular embodiments, the cron field specifies a cron job for the rule which will cause the rule to be executed at specific times. It will only be referenced if the trigger's event field is the string "time". In particular embodiments, the conditions field allows for further conditions to be specified before execution of the rule. It is formed as a JSON tree which supports AND, OR, and NOT logical operators. It can further be used to check the current time, and whether or not a device is in a specific state. An example of a conditions field is shown below.

In further embodiments, the type field specifies whether this is a state check or a logical operation. As mentioned above, the logical operations supported are AND, OR, and NOT. Three state checks are supported: value, range, and time.

In further embodiments, the check type field is used to specify the type of state check being defined. It is not needed for logical operations. Value checks are used to make sure a device is in a specific state. Range checks offer the same functionality as a value check, except they allow a range of values to be specified. Time checks are used to specify the time in which the rule should be executed. In particular embodiments, if a range or time check is define, the range_min and range_max fields must be specified. In particular embodiments, if a value check is define, value must be specified.

In further embodiments, the state_name field is used to specify the particular parameter being checked. For range and value checks, these are the values of the device being checked. For a time check, this can either be minutes, hours, date, day, or month. To specify an exact value for a time check (similar to a value check but for time), the same number should be used in the range_min and range_max fields.

```
"conditions": {
    "type": "and",
    "and": [
        {
            "type": "state",
            "deviceId": "abcd1234",
            "check_type": "range",
            "state_name": "volume",
            "range_min": 70,
            "range_max": 100
        },
        {
            "type": "or",
            "or": [
                {
                    "type": "not",
                    "not": [
                        {
                            "type": "state",
                            "deviceId": "abcd1234",
                            "check_type": "value",
                            "state_name": "current_track_id",
                            "value": 440
                        }
                    ]
                },
                {
                    "type": "state",
                    "check_type": "time",
                    "state_name": "month",
                    "range_min": 4,
                    "range_max": 8
                }
            ]
        }
    ]
}
```

In particular embodiments, the actions field tells the rule exactly what should happen if the rule is triggered and the conditions are met. An example is below. In further embodiments, the deviceId field specifies what device the actions will be performed on. In further embodiments, the actions field shows what parameters should be changed on the device, and what each parameter should be set to. Note: currently these should be in the same format that a Control command would use, except only one parameter should be specified in a single element in the array.

```
"actions": {
    "deviceId": "abcd1234",
    "settings": [{
        "on_off": "on",
        "bri": 10
    }]
}
```

In particular embodiments, a complete rule may look like the following example:

```
{
    "name": "rule1",
    "cron": "* * * * *",
    "trigger": {
        "deviceId": "asdfqwer",
        "event": {
            "check_type": "range",
            "range_min": 0,
            "range_max": 1
        }
    },
    "conditions": {
```

-continued

```
        "type": "and",
        "and": [
            {
                "type": "state",
                "deviceId": "abcd1234",
                "check_type": "range",
                "state_name": "volume",
                "range_min": 70,
                "range_max": 100
            },
            {
                "type": "or",
                "or": [
                    {
                        "type": "not",
                        "not": [
                            {
                                "type": "state",
                                "deviceId": "abcd1234",
                                "check_type": "value",
                                "state_name":"current_track_id",
                                "value": 440
                            }
                        ]
                    },
                    {
                        "type": "state",
                        "check_type": "time",
                        "state_name": "month",
                        "range_min": 4,
                        "range_max": 8
                    }
                ]
            }
        ]
    },
    "actions": {
        "deviceId": ""abcd1234",
        "settings": [{
            "on_off": "on",
            "bri": 10
        }]
    }
}
```

In particular embodiments, a discover command does not require further arguments. Thus, a full discover command may appear similar to the following example:

```
"data": {
    "command": "discover"
}
```

In particular embodiments, a command requires the ID of the queried device, as well as what type of device it is. A query command may appear similar to the following example:

```
"data": {
    "command": "query",
    "deviceId": "abcd1234",
    "deviceType": "music player"
}
```

In particular embodiments, a command causes gateway device 310 to change the current state of a connected device 305 given the parameters that are passed in the command. The parameters correspond to the type of connected device 305 being controlled, so the command may be formatted according to the type of connected device 305. An examples command is shown below:

```
"data": {
    "command": "control",
    "deviceId": "abcd1234",
    "settings": [{
        "volume": 100, // For parameterized functions
        "media_action": "play" // For nonparameterized
functions
    }]
}
```

In particular embodiments, a device cloud (e.g., system 300 in a home) may have a corresponding instance in the cloud. Each device action (user command, device event, etc.) may be logged and sent over a messaging queue of the device cloud instance. A recipe may contain one or multiple rules. A rule may have a device action, which can be executed with timing or triggered by another action. A particular device cloud instance may have a rule execution engine for digesting device action messaging queue and execute rules. In certain embodiments, there may be rules incorporating permissions, capabilities, events, and actions.

In particular embodiments, the base rule may be:

```
class Rule:
    def check(self):
        return True
    def action(self):
        print 'doing nothing'
    def reply(self):
        return 'I am not the guy you are looking for'
```

In particular embodiments, the schedule rule may be:

```
Recipe:{"name":"livingroom_hue_rule1","listens_to":
"front_door_lock","condition":{"livingroom_occupancy":
{"$eq":False}},"action":{"type":"control",
"value":"off"}}
```

```
class livingroom_hue_rule1(Rule):
    device_name = 'livingroom_hue'
    schedule = "0 0 * * *" 2 standard cron syntax
    def check(self):
        return current_user in home.livingroom.users
            and home.livingroom.occupancy == False
    def action(self):
        home.livingroom_hues.action("control", "off")
    def reply(self):
        return 'lights in living room were turned off'
```

In particular embodiments, the trigger rule may be:

```
Recipe:{"name":"livingroom_hue_rule2","listens_to":
"front_door_lock","condition":{"front_door_lock":
{"$eq":2}},"action":{"type":"control",
"value":"off"}}
```

```
def reply(self ):
    return 'lights in living room were turned off 'class
livingroom_hue_rule2(Rule):
    device_name = 'livingroom_hue'
    listens_to = ['front_door_lock']
    def check(self):
        return current_user in home.livingroom.users
            self.front_door_lock == 2 2 is open
```

```
def action(self):
    home.livingroom_hues.action('control', 'on')
def reply(self):
    return 'lights in living room were turned off'
```

In particular embodiments, the execution engine may be:

```
def add(rule):
    self.rules.add(rule)
    self.schedules.add(rule.schedule, rule)
    self.listens_to(rule.listens_to , rule)
def run( ):
    while hasMessage( ):
        message = nextMessage( )
        switch message.type:
            case 'rule': // scheduled rule
                rule = self.rules[message.rule_name]
                rule.action( )
                rule.reply( )
                break
            case 'action': // trigger rules
                self.rules[device_name].action( )
                for rule in self.listens_to[action.device_name]:
                    rule.action( )
                    rule.reply( )
                break
```

Figure 4:
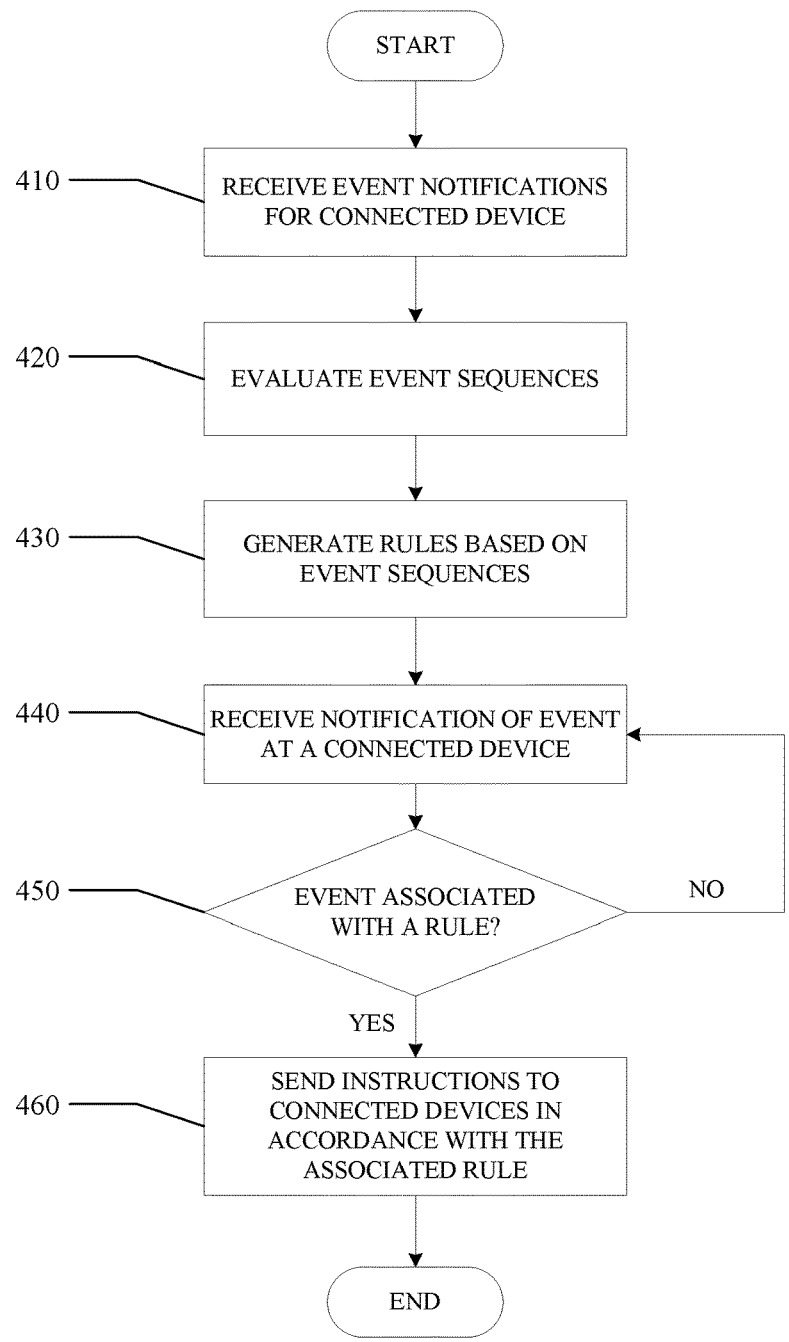
FIG. 4 illustrates an example method for generating and executing behavior-based rules for connected devices on a network.

FIG. 4 illustrates an example method 400 for generating and executing behavior-based rules for connected devices on a network. For ease of reference, method 400 is described below with respect to certain devices in system 300 of FIG. 3. However, it will be understood that the steps of method 400 may be performed by any suitable device in a device cloud in accordance with the present disclosure. Method 400 may be performed by executing software or other instructions embodied in a computer-readable medium using one or more processors embodied by a computing device or devices of the system (e.g., a computer system similar to computer system 500 of FIG. 5).

Method 400 begins at step 410, where backend system 320 receives notifications of events associated with the one or more connected devices 305. The event notifications may be received from the one or more connected devices 305 either directly or via gateway device 310. The event notifications may be sent in any suitable format, such as plain text or XML. In particular embodiments, the event notifications may include indications that a particular occurrence happened with respect to the connected device 305 that sent the notification. For example, when a door is unlocked, the lock (i.e., a connected device 305 of system 300) may send a notification to gateway device 310 indicating the unlock event. Gateway device 310 may then forward the notification to backend system 320, in the same format or in a different format from that sent by the lock device. In particular embodiments, an event may be a user input at a connected device 305 (or control device 315). For example, the user may command a stereo to turn on after returning home from work in the evening. The command sent may thus be the event or the stereo turning on may be the event, or both.

At step 420, backend system 320 evaluates event sequences for the connected devices 305. The event sequences may include two or more events associated with one or more connected devices 305 that occur within a particular time period. The event sequences may include events for a single connected device 305 or a plurality of connected devices 305. Thus, for every event notification received, backend system 320 may analyze that event and the next events that occur within the particular time period to determine whether the event sequence (if any occurs for the event) should become a rule for automatic execution in the future when the event occurs. In certain embodiments, the particular time period may be pre-determined, and may be, for example, 1 minute, 5 minutes, or 10 minutes. In other embodiments, the particular time period may be determined using historical data. This may include determining a maximum time difference for two events in an event sequence associated with a generated rule. For example, backend system 320 may look at the maximum time difference between a first and last event of event sequences in generated rules. Furthermore, a user may begin to reject or delete rules that they do not wish to be automatic. Based on these rejections, backend system 320 may determine a maximum amount of time for event sequences that are kept as rules and may use this amount of time as the maximum amount of time to evaluate event sequences.

In particular embodiments, evaluating the plurality of event sequences may include determining a score associated with each event sequence. In certain embodiments, the score for each event sequence may be determined based on time differences between the two or more events in the event sequence. For example, where events of an event sequence occur closely in time to one another, the event sequence may have a relatively high score. Conversely, where events of an event sequence occur many minutes from one another, the event sequence may have a relatively low score. In certain embodiments, the may be determined using the formula:

$$\text{score} = 1 - \Pi(D\text{max} - \min(\text{delta}N, D\text{max}))/D\text{max},$$

where:

Dmax refers to the particular time period; and deltaN refers to an amount of time between an Nth event in the event sequence and the chronologically-first event in the event sequence.

In particular embodiments, evaluating the event sequences may include determining that the event sequence is substantially similar to another event sequence and modifying the score associated with the event sequence accordingly. For example, where an event sequence has occurred previously, the score for such event sequences may be multiplied by a certain factor.

At step 430, backend system 320 generates a plurality of rules based on the event sequences evaluated at step 420. In particular embodiments, generating a rule may include determining that a score associated with the event sequence has exceeded a threshold. The threshold may be pre-determined in certain embodiments, or determined experimentally in other embodiments. For example, scores for rules kept or rejected by a user may be analyzed to determine a threshold for generating future rules.

In particular embodiments, whether a rule is generated or not may be based on one or more environmental conditions present during the evaluated event sequences. The one or more environmental conditions may include one or more of: a time of day, a day of week, an outside temperature (e.g., where a connected device is located inside), or an ambient temperature (i.e., around the connected device, outside or inside). For example, a user when returning home from work may turn on the stereo every night, but may not do so when arriving home for lunch or on the weekends. Thus, a rule for automatically turning on the stereo after a user has unlocked a door may only be triggered where the unlocking of the door occurs after 5 pm on a weekday.

In particular embodiments, a generated rule may be further based on a status of a connected device when the event sequence under evaluation begins. For example, an event sequence may include unlocking a door and then turning on the stereo (each device being a connected device 305). Sometimes, one or more lights may be on and sometimes they may be off when this event sequence occurs, which may be because the user does not turn on the stereo if someone is already home (i.e., why the lights are already on). Thus, in this example, a rule for automatically turning on the stereo may be based on whether one or more lights in the home are already turned on.

In particular embodiments, an exception may be generated that is associated with at least one rule of the plurality of rules. The exception may be generated by backend system 320 in some embodiments. For example, in evaluating the event sequence of unlocking a door and turning on the stereo, backend system 320 may determine that the event sequence only or mostly occurs during the weekdays. As such, backend system 320 may generate an exception to the rule dictating that the stereo be turned on when the user unlocks the door, indicating an exception for weekends. In other embodiments, the exception may be generated by a user of the system. For example, after a rule has been generated dictating that the stereo be turned on when the user unlocks the door, the user (via control device 315) may indicate an exception for weekends.

At step 440, backend system 320 receives an event notification for a connected device 305. The notification may be received after one or more rules have been generated by backend system 320 at step 430. The event notification may indicate a first event has occurred at a first connected device 305.

At step 450, backend system 320 determines whether the event received at step 440 is associated with any rule generated at step 430. In particular embodiments, this may include determining that a first rules of the plurality of rules is based on the first event for which the notification was received at step 440. In some embodiments, this step may include backend system 320 analyzing the rules already generated to determine which rules have event sequences that start with the first event (i.e. those that are chronologically first in the event sequence). This step may further include determining which rules of those that have event sequences that start with the first event have one or more matching conditions (e.g., environmental conditions).

If the event is not associated with any rule, the method returns to step 440 where backend system 320 waits to receive additional event notifications from connected devices 305. If the event received at step 450 is associated with a particular rule, then, at step 460, backend system 320 sends instructions to connected devices 305 in accordance with the particular rule. The instructions may be sent as a part of a message to the connected devices 305 associated with the rule (i.e., those participating in the event sequence that is part of the rule). The instructions may be sent to connected devices 305 directly or via gateway device 310. The instructions may be in any suitable format for performing the action on the particular connected device 305. In some embodiments (e.g., those having devices from different vendors), the format of each respective message including instructions may be different for each connected device 305. In certain embodiments, the instructions may be in a format similar to the pushed rule command formats discussed above with reference to FIG. 3. In the door lock and stereo example from above, this step may thus include sending instructions to the stereo to turn on (or perform one or more other actions) after detecting that the door has unlocked in the evening with no lights on.

Particular embodiments may repeat one or more steps of the method 400 of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Furthermore, although this disclosure describes particular components, devices, or systems carrying out particular steps of the method 400 of FIG. 4, this disclosure contemplates any suitable combination of any suitable components, devices, or systems carrying out any suitable steps of the method 400 of FIG. 4.

Figure 5:
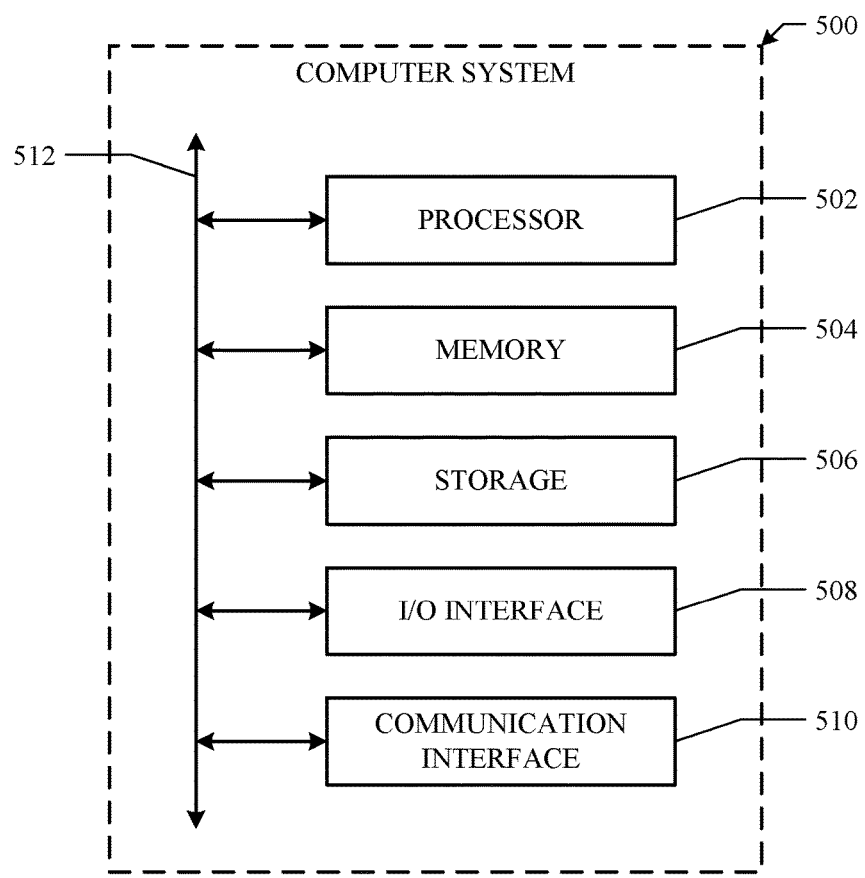
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by one or more computing devices, receiving, from one or more connected devices on a network, notifications of events associated with the one or more connected devices;
by the one or more computing devices, evaluating a plurality of event sequences, each event sequence comprises two or more events occurring within a particular time period;
by the one or more computing device, determining a score associated with each event sequence based on the particular time period associated with the event sequence, and a time difference between an event and the chronologically-first event in the event sequence, wherein the score for a particular event sequence is relatively high when the time difference between events of the particular event sequence is low as compared to time difference between events of other event sequences in the plurality;
by the one or more computing devices, generating one or more rules based on scores associated with one or more event sequences exceeding a threshold score;
by the one or more computing devices, receiving a notification of a first event associated with a first connected device on the network;
by the one or more computing devices, determining that a first rule of the one or more rules is based on the first event; and
by the one or more computing devices, sending one or more instructions to connected devices in accordance with the first rule.

2. The method of claim 1, wherein:
the score associated with each event sequence is further based on Dmax−min(deltaN,Dmax);
Dmax refers to the particular time period; and
deltaN refers to an amount of time between an Nth event in the event sequence and the chronologically-first event in the event sequence.

3. The method of claim 2, wherein the score for each event sequence is further based on Π(Dmax−min(deltaN,Dmax)).

4. The method of claim 3, wherein the score is determined using the formula:

score=1−Π($D$max−min(delta$N$,$D$max))/$D$max.

5. The method of claim 2, further comprising, for each event sequence:
by the one or more computing devices, determining that the event sequence is substantially similar to another event sequence; and
by the one or more computing devices, modifying the score associated with the event sequence.

6. The method of claim 1, wherein generating the one or more rules is further based on one or more environmental conditions present during the evaluated event sequences.

7. The method of claim 6, wherein the one or more environmental conditions comprises one or more of: a time of day, a day of week, an outside temperature, or an ambient temperature.

8. The method of claim 6, wherein the first rule is further based on a first environmental condition.

9. The method of claim 6, further comprising receiving a detected environmental condition associated with the first event, wherein determining that the first rule is based on the first event comprises determining that the first rule is further based on the detected environmental condition.

10. The method of claim 1, wherein the particular time period is determined using historical data.

11. The method of claim 10, wherein determining the particular time period using historical data comprises determining a maximum time difference for two events in an event sequence associated with a generated rule.

12. The method of claim 1, wherein at least one event comprises a user input at a connected device of the one or more connected devices.

13. The method of claim 1, further comprising generating an exception that is associated with at least one rule of the one or more rules.

14. The method of claim 1, wherein generating the one or more rules is further based on a status of a connected device when the evaluated event sequences begin.

15. One or more computer-readable non-transitory storage media embodying software that is operable when executed to:
receive, from one or more connected devices on a network, notifications of events associated with the one or more connected devices;
evaluate a plurality of event sequences, each event sequence comprises two or more events occurring within a particular time period;
determine a score associated with each event sequence based on the particular time period associated with the event sequence, and a time difference between an event and the chronologically-first event in the event sequence, wherein the score for a particular event sequence is relatively high when the time difference between events of the particular event sequence is low as compared to time difference between events of other event sequences in the plurality;
generate one or more rules based on scores associated with one or more event sequences exceeding a threshold score;
receive a notification of a first event associated with a first connected device on the network;
determine that a first rule of the plurality of one or more rules is based on the first event; and
send one or more instructions to connected devices in accordance with the first rule.

16. The media of claim 15, wherein:
the score associated with each event sequence is further based on Dmax−min(deltaN,Dmax);
Dmax refers to the particular time period; and
deltaN refers to an amount of time between an Nth event in the event sequence and the chronologically-first event in the event sequence.

17. The media of claim 16, wherein the software is further operable when executed to:
determine that the event sequence is substantially similar to another event sequence; and
modify the score associated with the event sequence.

18. The media of claim 15, wherein the software is further operable when executed to generate the one or more rules based on one or more environmental conditions present during the evaluated event sequences.

19. A system comprising: one or more processors; and a memory coupled to the processors comprising instructions executable by the processors, the processors being operable when executing the instructions to:
- receive, from one or more connected devices on a network, notifications of events associated with the one or more connected devices;
- evaluate a plurality of event sequences, each event sequence comprises two or more events occurring within a particular time period;
- determine a score associated with each event sequence based on the particular time period associated with the event sequence, and a time difference between an event and the chronologically-first event in the event sequence, wherein the score for a particular event sequence is relatively high when the time difference between events of the particular event sequence is low as compared to time difference between events of other event sequences in the plurality;
- generate one or more rules based on scores associated with one or more event sequences exceeding a threshold score;
- receive a notification of a first event associated with a first connected device on the network;
- determine that a first rule of the one or more rules is based on the first event; and
- send one or more instructions to connected devices in accordance with the first rule.

* * * * *